(12) United States Patent
Beranek

(10) Patent No.: US 10,398,258 B2
(45) Date of Patent: Sep. 3, 2019

(54) HANDLE AND CONTAINER WITH HANDLE

(71) Applicant: Gerald Beranek, North Liberty, IA (US)

(72) Inventor: Gerald Beranek, North Liberty, IA (US)

(*) Notice: Subject to any disclaimer, the term of this patent is extended or adjusted under 35 U.S.C. 154(b) by 640 days.

(21) Appl. No.: 14/506,339

(22) Filed: Oct. 3, 2014

(65) Prior Publication Data
US 2016/0095467 A1 Apr. 7, 2016

Related U.S. Application Data

(60) Provisional application No. 61/887,072, filed on Oct. 4, 2013.

(51) Int. Cl.
A47J 36/10 (2006.01)
A47J 36/12 (2006.01)
A47J 45/06 (2006.01)

(52) U.S. Cl.
CPC ............ A47J 36/12 (2013.01); A47J 36/10 (2013.01); A47J 45/06 (2013.01)

(58) Field of Classification Search
CPC ............ A47J 36/12; A47J 36/10; A47J 45/06
USPC ......... 99/324, 340, 341, 357, 359, 447, 449; 220/573.1–573.5
See application file for complete search history.

(56) References Cited

U.S. PATENT DOCUMENTS

| 203,541 | A | 5/1878 | Henkel |
| 315,280 | A | 4/1885 | Headley |
| 537,546 | A | 4/1895 | Nellis |
| 851,969 | A | 4/1907 | Vernon |
| 1,137,078 | A | 4/1915 | Nicodemus |
| 1,328,672 | A | 1/1920 | Hirsohn |
| 1,588,862 | A | 6/1926 | Walker |
| 1,594,437 | A | 8/1926 | Walsh |
| 2,007,250 | A | 7/1935 | Kellner |
| 2,098,858 | A | 11/1937 | Busson et al. |
| 2,233,789 | A | 3/1941 | Lichtenberger |
| 2,736,455 | A | 2/1956 | Rosen |
| 2,812,100 | A * | 11/1957 | Regan ............... A01J 9/00 220/212.5 |
| 3,471,054 | A | 10/1969 | Ostrowsky et al. |
| 3,761,135 | A | 9/1973 | Mundinger et al. |
| 4,836,179 | A | 6/1989 | Schlosser et al. |
| 5,638,984 | A | 6/1997 | Munari |
| 6,041,960 | A | 3/2000 | Leal |
| 6,450,361 | B1 | 9/2002 | Mendelson et al. |
| 6,987,247 | B2 | 1/2006 | Schaffeld et al. |
| D549,831 | S | 8/2007 | Ward et al. |
| 7,485,831 | B2 | 2/2009 | Tynes et al. |
| 8,356,726 | B2 | 1/2013 | Romandy et al. |
| 8,584,894 | B1 * | 11/2013 | Mulvaney ............ A47J 36/10 220/318 |
| 2005/0145615 | A1 * | 7/2005 | Schaffeld ............ A47J 45/065 219/440 |

(Continued)

Primary Examiner — Christopher S Kim
(74) Attorney, Agent, or Firm — David M. Breiner; BrownWinick Law Firm

(57) ABSTRACT

Example embodiments relate to a handle. In example embodiments, the handle may be attached to a container, for example, a slow cooker. In example embodiments the handle may be used to transport the container and may also be used to secure a lid to the container. In example embodiments, the handle may also be configured to receive and support the lid.

10 Claims, 11 Drawing Sheets

(56) References Cited

U.S. PATENT DOCUMENTS

| | | | | |
|---|---|---|---|---|
| 2010/0251902 A1* | 10/2010 | Schandel | .............. | A47J 27/004 |
| | | | | 99/348 |
| 2012/0223067 A1* | 9/2012 | Gaynor | .................. | A47J 36/10 |
| | | | | 219/438 |
| 2013/0306638 A1* | 11/2013 | Ye | .......................... | A47J 36/10 |
| | | | | 220/318 |

* cited by examiner

HANDLE AND CONTAINER WITH HANDLE

CROSS-REFERENCE TO RELATED APPLICATION

This application claims the benefit of U.S. Provisional Patent Application No. 61/887,072 filed with the United States Patent and Trademark Office (USPTO) on Oct. 4, 2013, the entire contents of which is herein incorporated by reference.

BACKGROUND

1. Field

Example embodiments relate to a handle. In example embodiments, the handle may be attached to a container, for example, a container of a slow cooker. In example embodiments the handle may be used to transport the container and may also be used to secure a lid to the container. In example embodiments, the handle may also be configured to receive and support the lid as well as other items such as cooking utensils.

2. Description of the Related Art

Slow cookers are often used to cook food and keep the food in a relatively warm state. Lids are commonly used with slow cookers to prevent the food from spilling. Some of these lids are held in place by clips arranged on a side wall of the slow cooker. In the event a person wishes to gain access to the contents of the slow cooker, the person would typically have to unclip the lid from the container (if clips are present) and either hold the lid or set it to the side of the slow cooker.

SUMMARY

The inventor has noted that many conventional slow cookers are not configured with a means or a structure to support a lid after the lid is removed from the slow cooker. Further, the conventional slow cookers which do have such a structure are often not aesthetically pleasing, are relatively difficult to use, or do not adequately support the lid. Further yet, slow cookers generally do not have a single handle allowing them to be carried using one hand. Rather, most conventional slow cookers include two handles arranged on sides thereof requiring a user to use both hands to carry and/or move the slow cooker. As a solution to the above problems the inventor developed a handle which may be used with a slow cooker. The handle is specially designed with a receiving area into which a lid of a slow cooker may be placed. The handle, of course, may be built into newly manufactured slow cookers or may be provided separately as a means to retrofit existing slow cookers. The inventor also designed the handle so that, in addition to serving as a structure to receive a slow cooker lid, can act as a locking device to secure a lid to the slow cooker. Thus, the handle has a dual purpose: act as a receiving structure to receive a slow cooker lid, and secure a lid to the slow cooker. The inventor notes the inventive concepts of the slow cooker handle are not limited to slow cookers. For example, the inventive concepts may be applied in a wide variety of fields and in fact may be used with any container that has a lid. For example, the invention may be applied to the metal working industry where hot materials, for example, bolts or molten metal, are moved from one place to another using containers with lids. As another nonlimiting example, the handle may be used with paint cans to secure a paint can lid to the paint can and then serve as a support for a paint can lid.

In accordance with example embodiments, a handle may include a receiving area, a first arm extending from the receiving area, and a first lock supported by the first arm. In example embodiments the receiving area may include a first bearing surface and a second bearing surface offset from the first bearing surface. Also, in example embodiments, the first arm may be configured to attach to a container.

In accordance with example embodiments, a system may include a container, a lid configured to cover an opening of the container, and a handle extending across the container. In example embodiments the handle may include at least one lock configured to lock the lid in place and a receiving portion configured to entirely support the lid when the lid is not covering the opening of the container.

BRIEF DESCRIPTION OF THE DRAWINGS

Example embodiments are described in detail below with reference to the attached drawing figures, wherein.

DETAILED DESCRIPTION

Figure 1:
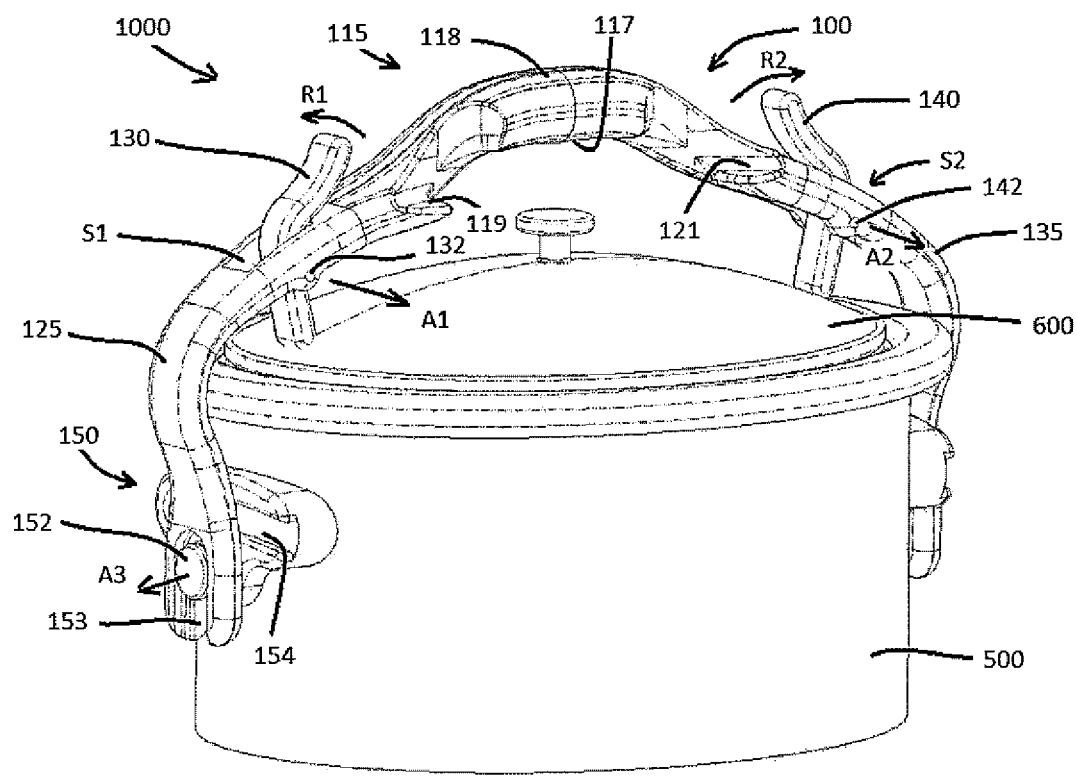
FIG. 1 is a perspective view of a system in accordance with example embodiments.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventor has contemplated that the claimed subject matter might also be embodied in other ways, to include different features or combinations of features similar to the ones described in this document, in conjunction with other technologies. Generally, example embodiments of the invention relate to a handle. In example embodiments, the handle may be attached to a container and the handle may be configured to secure a lid to the container. In example embodiments, the handle may also be configured with a receiving area configured to receive the lid.

FIG. 1 is a view of a system 1000 in accordance with example embodiments. In example embodiments the system 1000 may include a container 500, a lid 600, and a handle 100. In example embodiments, the container 500 may be, but is not required to be, comprised of a housing, a heating element, and a container as is found in conventional slow cookers. Thus, in example embodiments, the handle 100 may be configured to attach to a conventional slow cooker. This aspect of example embodiments, however, is not intended to limit the invention as the container 500 may not be associated with a slow cooker.

Figure 5:
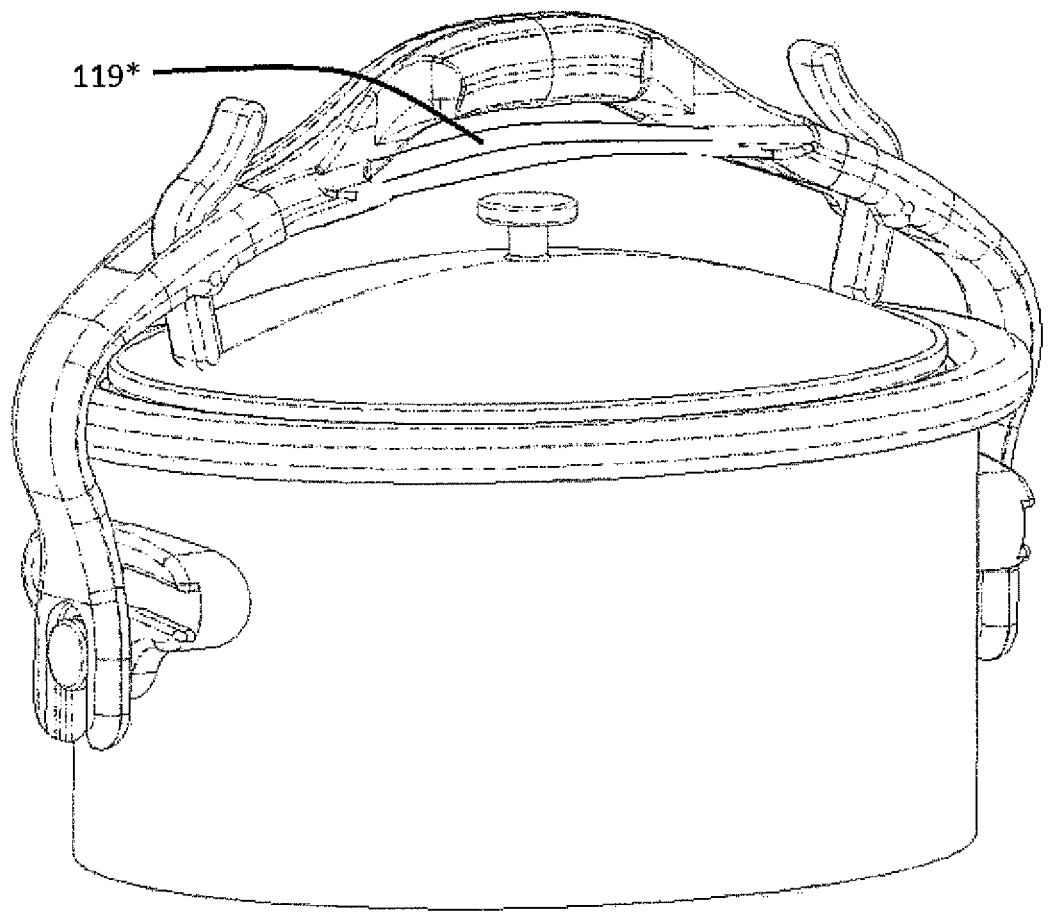
FIG. 5 is a view of a system in accordance with example embodiments.

As shown in example embodiments, the handle 100 may include a receiving area 115, a first arm 125, and a second arm 135. As will be explained shortly, the receiving area 115 may be configured to receive and support the lid 600. For example, in example embodiments, the receiving area 115 may include a first bearing surface 117, a second bearing surface 119, and a third bearing surface 121. In example embodiments, the second and third bearing surfaces 119 and 121 may be offset from the first bearing surface 117 as shown in FIG. 1. Although example embodiments illustrate the receiving area 115 as comprising a first bearing surface 117, a second bearing surface 119, and a third bearing surface 121, the invention is not limited thereto. For example, in example embodiments, the second and third bearing surfaces 119 and 121 may be part of a long continuous surface 119* which spans the area between them as shown in FIG. 5. Thus, in example embodiments, the receiving area 115 may only include two bearing surfaces. On the other hand, the receiving area 115 might be configured with more than three bearing surfaces. For example, in example embodiments, the first bearing surface 117 may be split into two bearing surfaces.

In example embodiments, the receiving area 115 may include a grip 118 and the first bearing surface 117 may be a part of the grip 118. Example embodiments, however, are not limited thereto as the first bearing surface 117 may not be a part of the grip 118. For example, the first bearing surface 117 may be associated with a part of the handle 100 not associated with the grip 118. In example embodiments, the grip 118 may be configured to be grasped by the human hand. Thus, in example embodiments, a user may grasp the grip 118 and use the grip 118 while carrying the container 500 from one location to another.

In example embodiments, the first arm 125 may be associated with a first lock 130. The first lock 130, for example, may resemble an "L" shaped member which may be configured to rotate into and contact the lid 600. FIG. 1, for example, shows a surface of the first lock 130 contacting the lid 600. In example embodiments, the first lock 130 may rotate about a pin 132 which may extend in a widthwise direction of the first arm 125. In example embodiments, the pin 132 may span a slot S1 formed in the first arm 125 and the first lock 130 may rotate within the slot S1. In FIG. 1, the direction of rotation is illustrated as R1. The example first lock 130 is not intended to limit the invention since other types of locks may be useable with example embodiments. For example, in example embodiments the first lock 130 may resemble a U-shaped lock which may be configured to bridge the first arm 125. As such, the first lock 130 is not required to rotate within a slot S1 as illustrated in the figures. As yet another example, the first lock 130 may, instead of resembling an "L" shaped rotatable member, resemble a push rod extending from the first arm 125. In this latter embodiment, the push rod may be pushed by a user to press against the lid 600 to secure the lid in place. As yet another example, the first lock 130 may resemble a bar connected by a hinge to a surface of the first arm 125 facing the lid 600. In this latter embodiment, the first lock 130 may be rotated downwards to press against the lid 600 to secure the lid 600 in place. In this later embodiment, springs may be added to the first lock 130 to bias the locks against the lid 600.

In example embodiments, the second arm 135 may be associated with a second lock 140. The second lock 140, for example, may resemble an "L" shaped member which may be configured to rotate into and contact the lid 600. For example, in example embodiments, the second lock 140 may rotate about a pin 142 which may extend in a widthwise direction of the second arm 135. In example embodiments, the pin 142 may span a slot S2 formed in the second arm 135 and the second lock 140 may rotate within the slot S2. In FIG. 1, the direction of rotation is illustrated as R2. The example second lock 130 is not intended to limit the invention since other types of locks may be useable with example embodiments. For example, in example embodiments the second lock 140 may resemble a U-shaped lock which may be configured to bridge the second arm 135. As such, the second lock 140 is not required to rotate within a slot as illustrated in the figures. For example, the second lock 140 may be configured in any of the alternative manners consistent with the first lock 130.

In example embodiments, the receiving area 115, the first arm 125, and the second arm 135 may be fabricated as one piece, for example, through a casting or machine process. On the other hand, the receiving area 115, the first arm 125, and the second arm 135 may be formed separately and then attached together by conventional processes such as gluing, screwing, bolting, riveting, clipping, and/or pinning.

Figure 2:
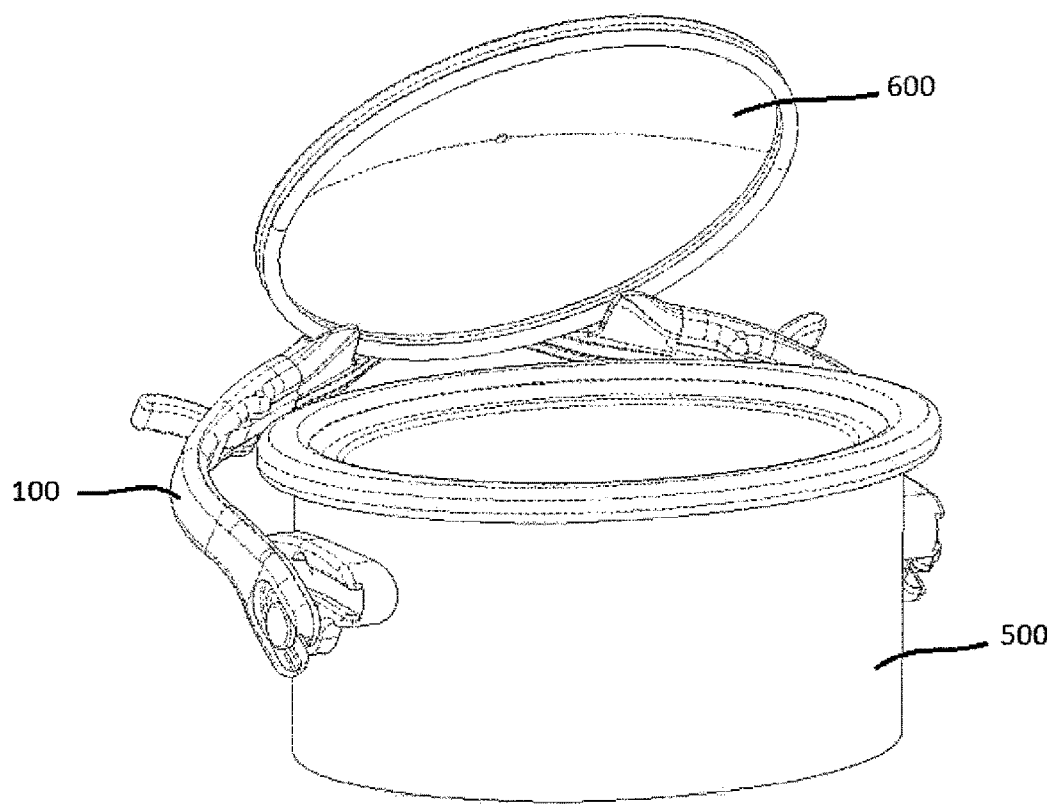
FIG. 2 is a perspective view of the system in accordance with example embodiments, wherein a lid is supported by a handle.
Figure 3:
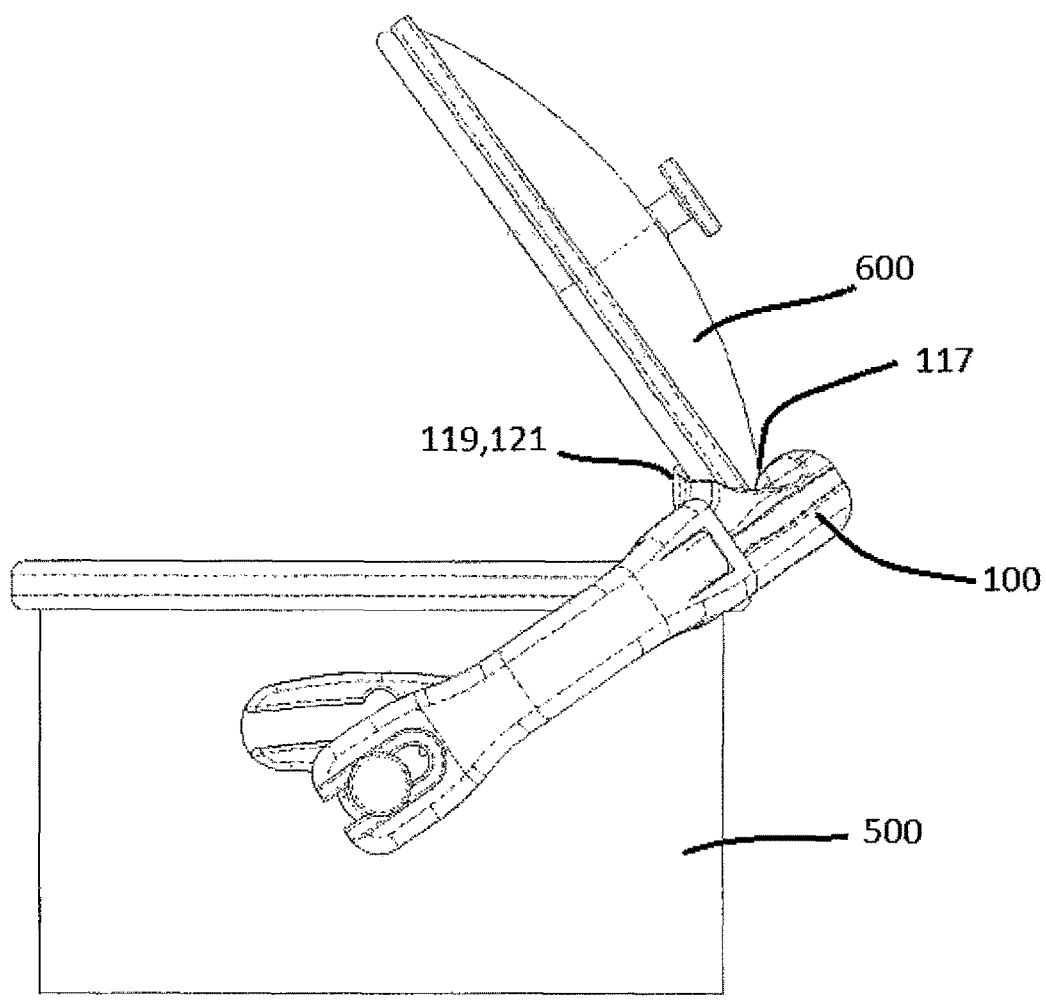
FIG. 3 is a side view of the system in accordance with example embodiments, wherein the lid is supported by the handle.

In example embodiments, the handle 100 may be rotatably attached to the container 500. For example, as shown in FIG. 2, the handle 100 may be rotated so that the handle 100 is not directly above a centerline of the container 500 (as shown in FIG. 1). In the rotated configuration the lid 600 may be removed from the container 500 and placed into the receiving area 115 of the handle 100 as shown in FIG. 2. FIG. 3 illustrates a side view handle 100 in the rotated configuration. As shown in FIG. 3, a top side of the lid 600 may bear against the first bearing surface 117, and a bottom side of the lid 600 may bear against the second and third bearing surfaces 119 and 121. Thus, in the rotated position, the handle 100 may be used to receive and support the lid 600 so that a user may access contents of the container 500.

FIGS. 4A-4D are close up views of an attachment 150 which may be used to attach the handle 100 to the container 500. In example embodiments, the attachment 150 may be a separately formed structure which is subsequently attached to the container 500 via a conventional means such as, but not limited to, gluing, bolting, and/or welding, or may be formed integrally with the container 500 as through a casting process. In example embodiments, the attachment 150 may include an attachment member 152. The attachment member 152 may fit into a slot 153 which may be formed in the first arm 125. In example embodiments, the attachment member 152 may include a head 152-1 having a diameter larger than a width of the slot 153 and a neck 152-2 smaller than the width of the slot 153. As such, the attachment member 152 may resemble a bolt with a neck configured to fit into the slot 153. Thus, in example embodiments, the attachment member 152 may capture the arm 125 yet allow the arm 125 to translate and rotate with respect to the attachment member 152.

In example embodiments, the attachment 150 may further comprise a slot 154 which may be arc shaped. In example embodiments, the slot 154 may be configured to receive a protrusion 156 extending from an inner surface of the first arm 125. In example embodiments, the protrusion 156 may be configured to slide within the slot 154. In example embodiments, the slot 154 may include a nook 158 arranged near a middle thereof. The nook 158 may be configured to receive the protrusion 156. For example, when the handle 100 is arranged over the middle of the container 500 (as shown in FIG. 1) the protrusion 156 may be arranged in line with the nook 158. When the locks 130 and 140 are engaged, the protrusion 156 may be pulled into the nook 158. When the protrusion 156 is in the nook 158, the handle 100 may be unable to rotate since the protrusion 156 may no longer completely reside in the arc shaped portion of the slot 154. When the locks 130 and 140 are disengaged, the protrusion 156 may be moved back into the slot 154 and the handle 100 may be rotated back and forth as indicated by the arrow in FIG. 3. In example embodiments, the second arm 135 may be attached to the container 500 by a similar or identical attachment.

Figure 4A:
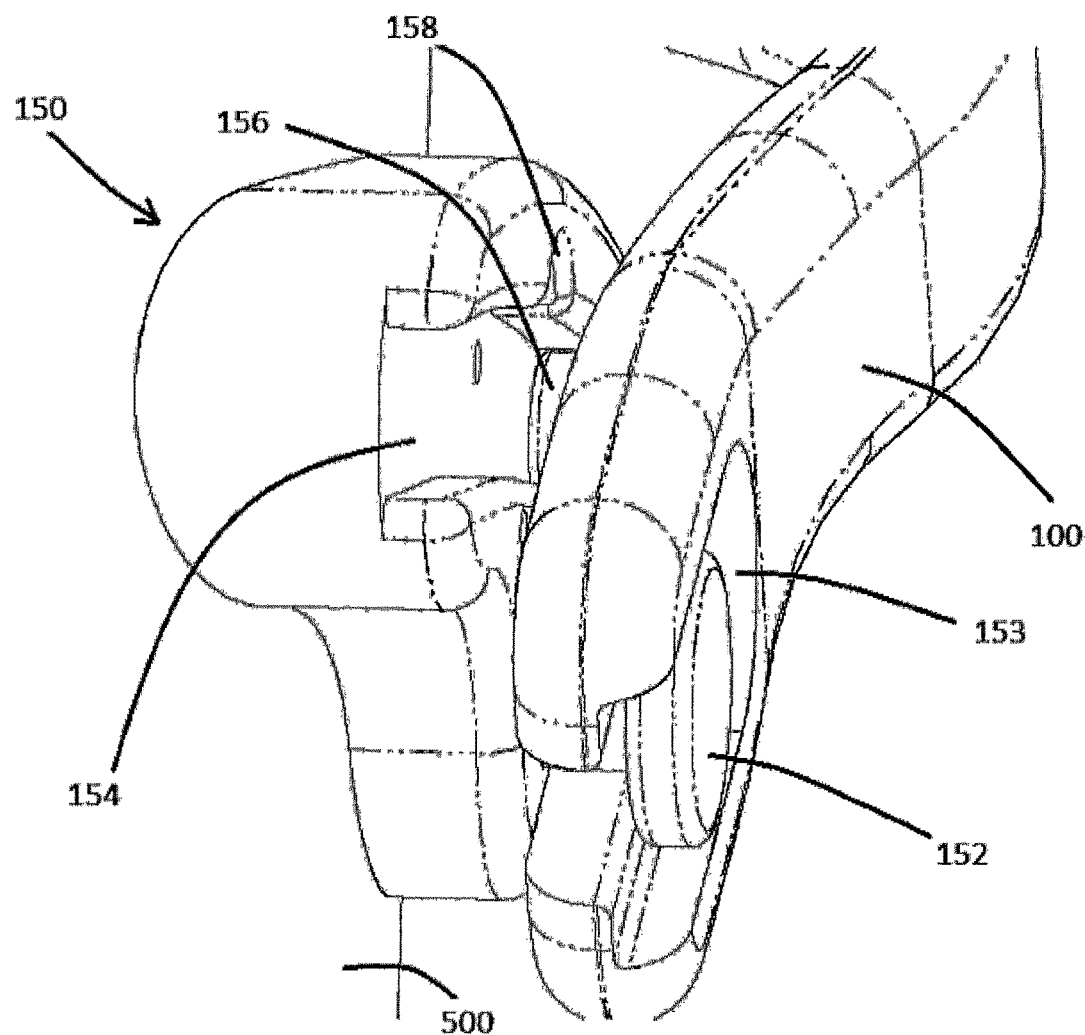
FIG. 4A-4D are close up views of an attachment in accordance with example embodiments.
Figure 4B:
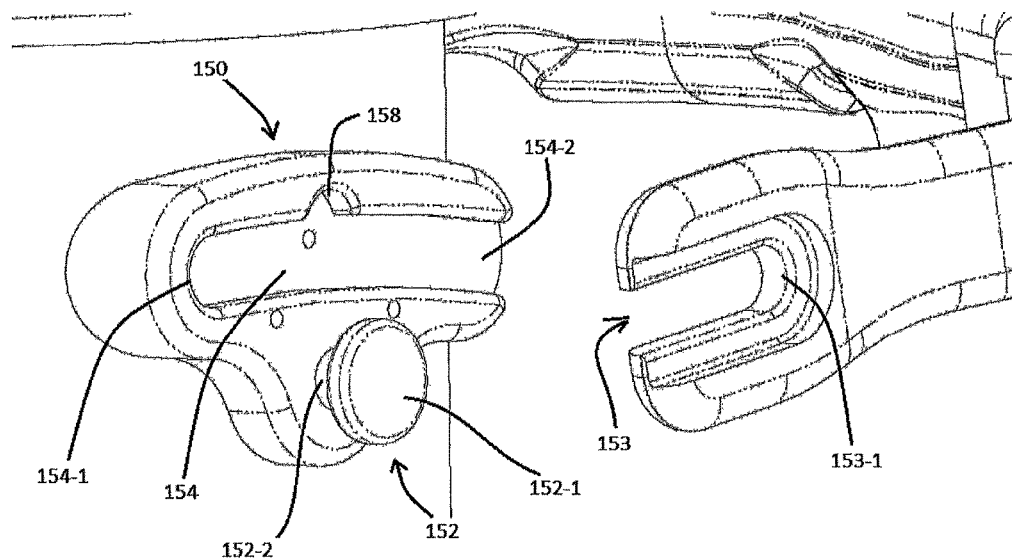
Figure 4C:
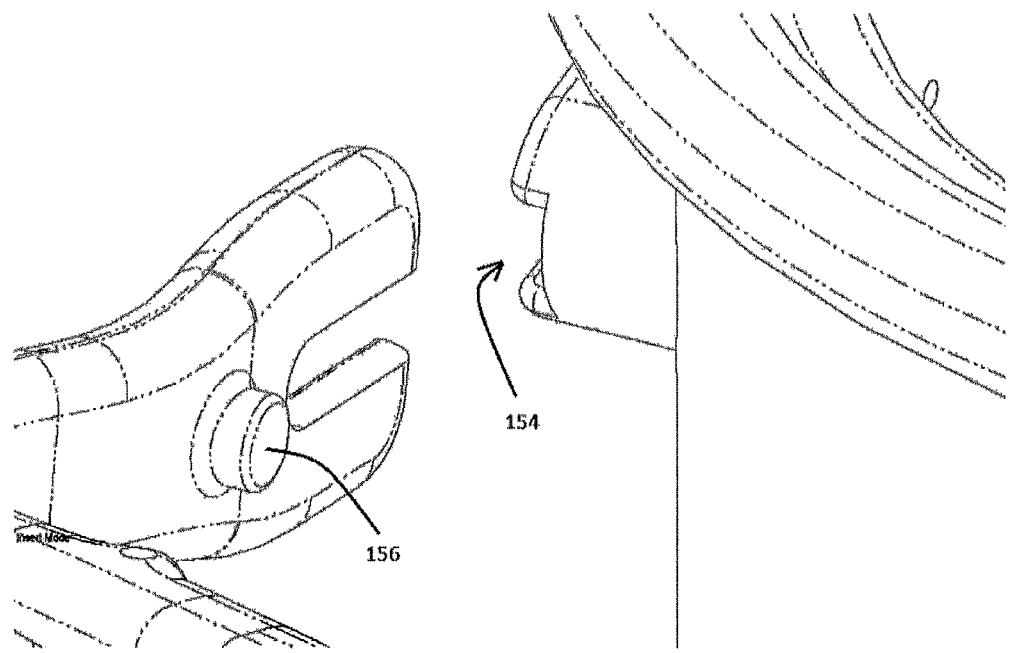
Figure 4D:
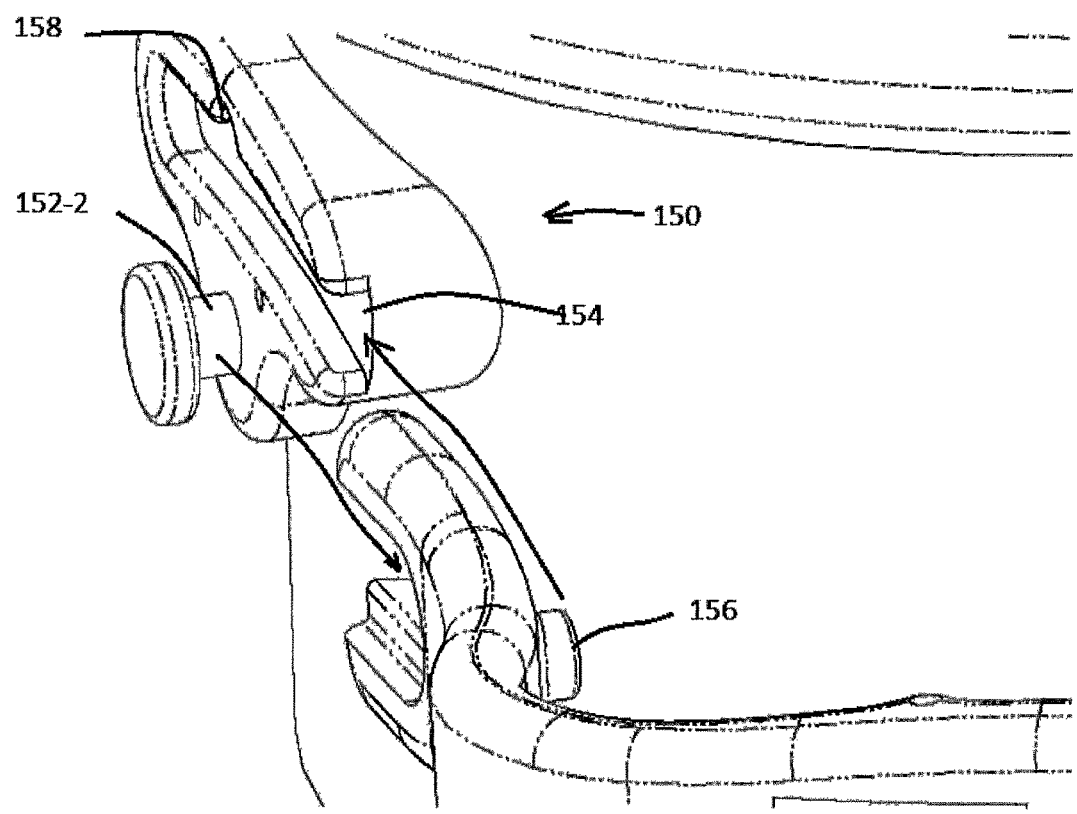

In example embodiments an end 154-1 of the slot 154 may be closed while another end 154-2 of the slot 154 may be open. In example embodiments such a configuration may allow for the handle 100 to be easily removed. Referring to FIG. 4D it is observed that the handle 100 may be moved in a manner that allows the neck 152-2 of the attachment member 152 resides in the slot 153 of the handle 100. Once the handle 100 is moved so that the attachment member 152 bears up against a back wall 153-1 of the slot 153 the handle 100 may be rotated to insert the protrusion 156 into the slot 154.

In example embodiments the lid 600 and the handle 100 may be entirely separate members. Thus, the lid 600 may be removed from the container 500 without affecting the handle 100. In example embodiments, the lid 600, however, may be placed into the receiving area 115 of the handle 100 as shown in FIG. 2. Thus, the handle 100 serves not only as a means to carry the container 500 and the contents therein, but serves as a means to support the lid 600 when a user desires access to the contents of the container 500. In addition, the lid 600 may be (but is not required to be) supported in a manner that partially overlies the container 500 (as shown in FIGS. 2 and 3). In the event the container is holding food, this is highly desirable in that it offers the food some protection from the environment and allows condensation to drip into the container. Also, as the attachment 150 and the handle 100 may be fabricated separately from the container 500, the attachment 150 and the handle 100 may be provided as a kit to retrofit pre-existing containers such as, but not limited to, slow cookers. In the alternative, the attachment 150 may be integral with the container 500 as through a casting process.

Figure 6:
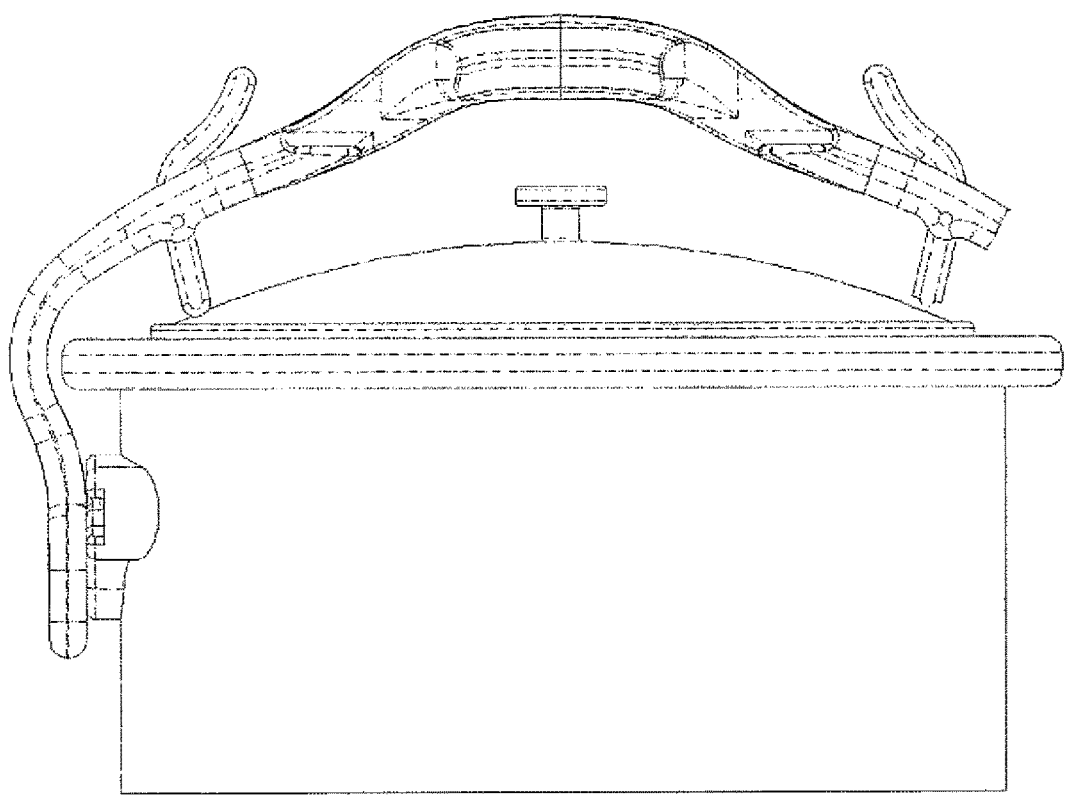
FIG. 6 is a view of a system in accordance with example embodiments.
Figure 7:
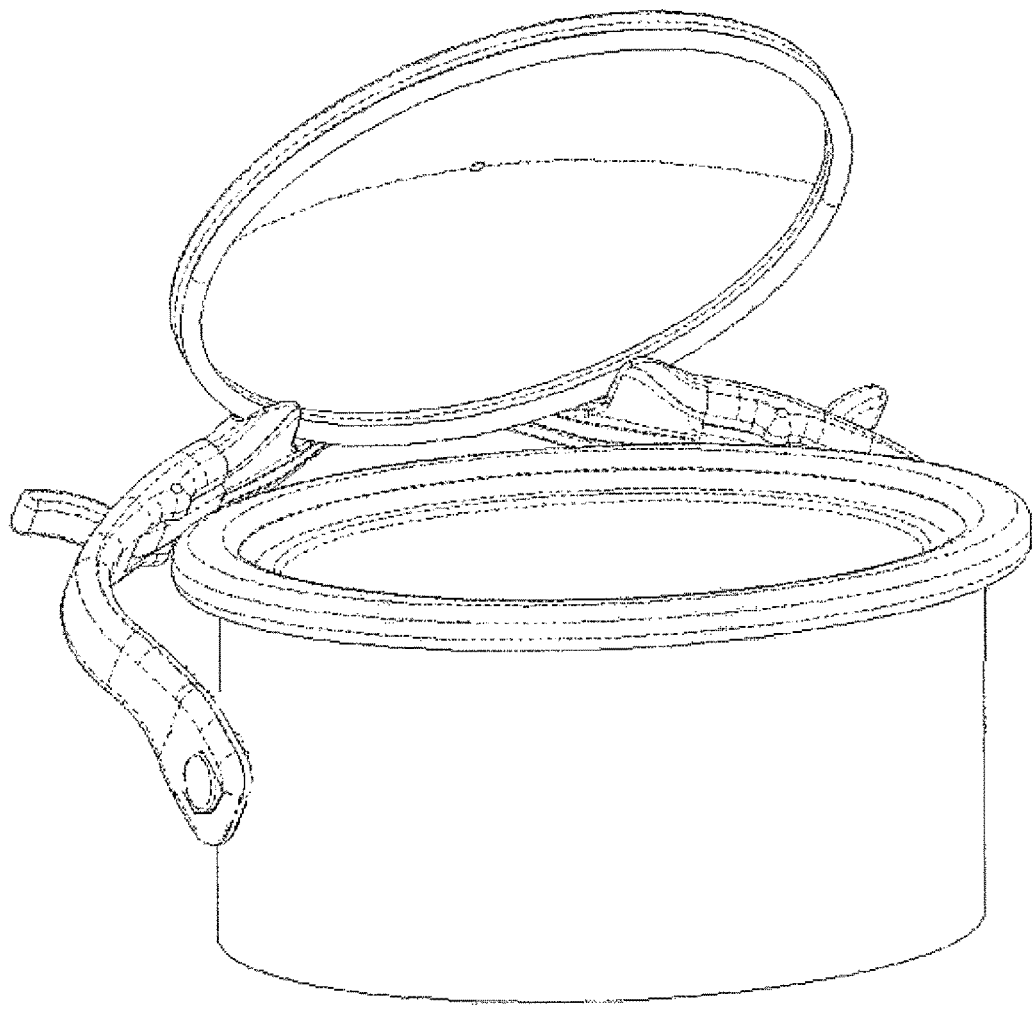
FIG. 7 is a view of a system in accordance with example embodiments.

The above described examples are not intended to limit the invention. For example, FIG. 6 illustrates another example of a handle connected to a container, only FIG. 6 has one end connected to the container rather than two ends. FIG. 7 is another example. The embodiment of FIG. 7 is substantially the same as the embodiment of FIG. 1 except that instead of having the attachment 150, the handle of FIG. 7 is bolted directly to the container and thus swings in a circular manner. Also, several of the above described features are not necessary. For example, in example embodiments, the nook 158 is not required to be present in the attachment 150 or may only be present in one attachment 150.

In addition to the above, several other aspects of example embodiments should not be interpreted as critical. For example, in example embodiments, the first and second locks 130 and 140 may rotate about axes A1 and A2 which may be perpendicular to the axis A3 the handle 100 rotates about. However, such a limitation is not a critical feature of example embodiments.

Figure 8:
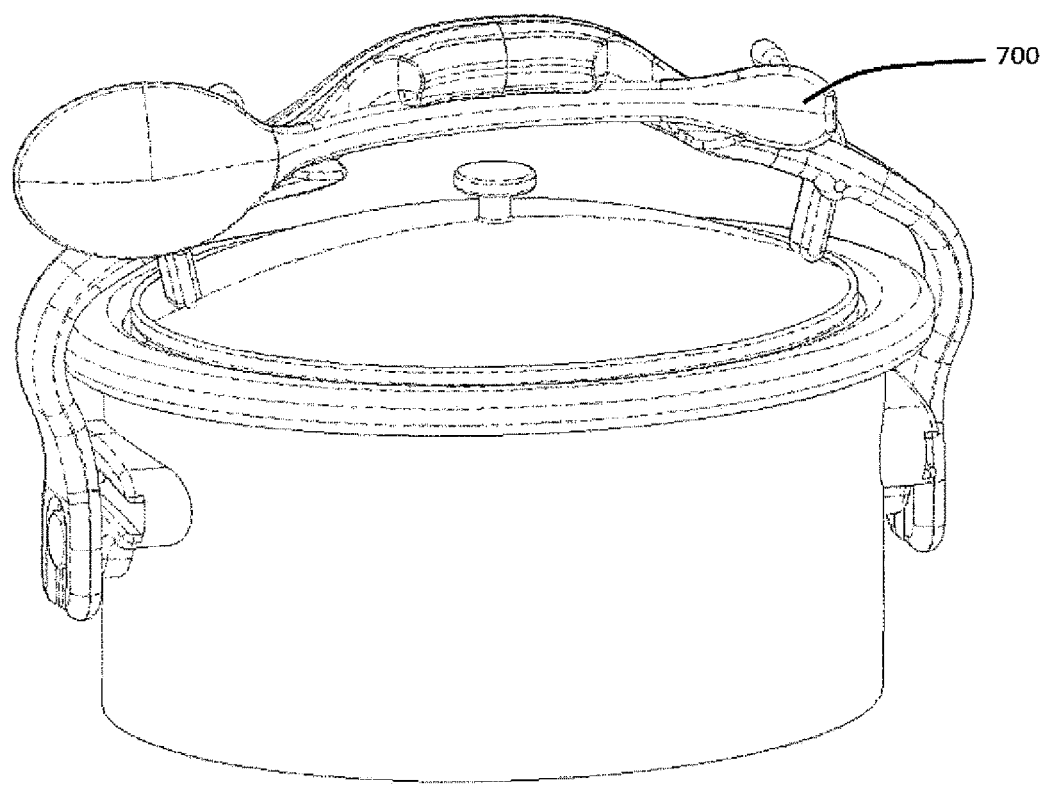
FIG. 8 is a view of a system in accordance with example embodiments.
Figure 9:
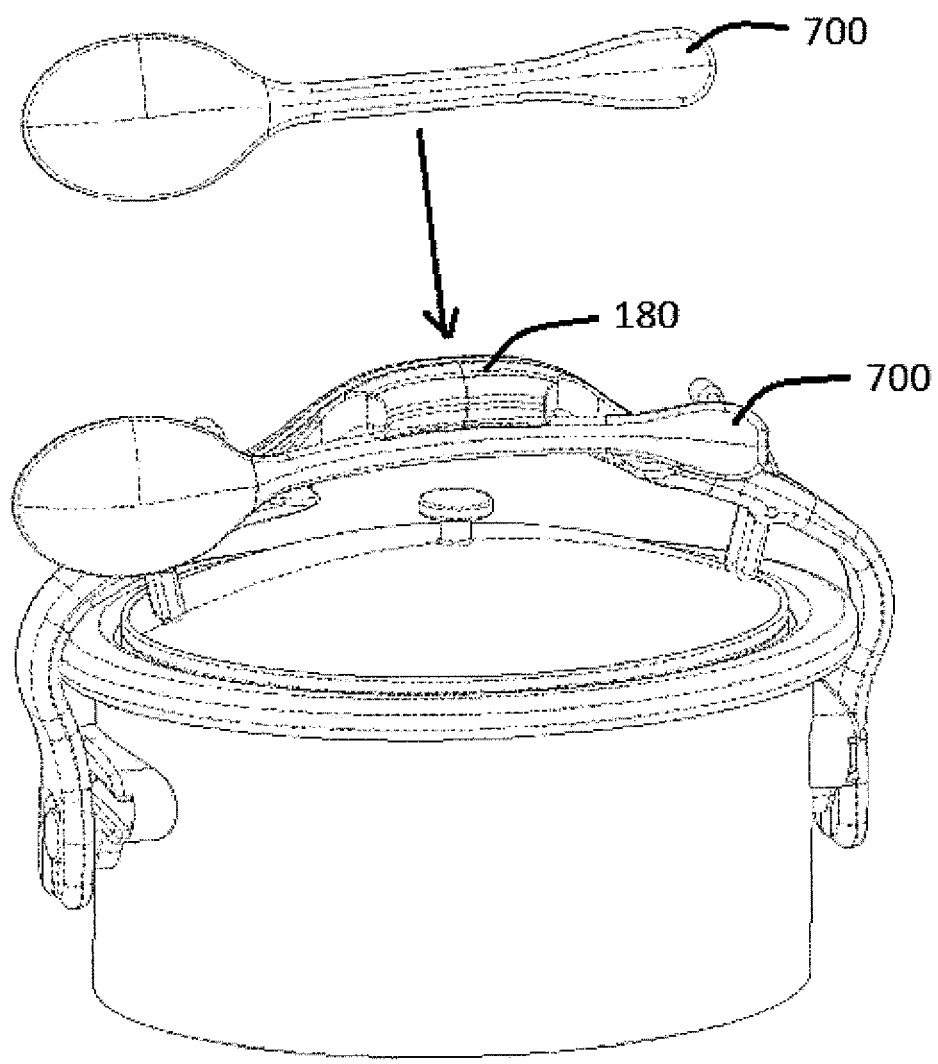
FIG. 9 is a view of a system in accordance with example embodiments.

FIG. 8 shows another aspect of example embodiments. As shown in FIG. 8, the receiving area 115 may not only be configured to support a lid 600, but a spoon 700 as well. For example, as show in FIG. 8, a spoon 700 may be arranged in the receiving area 115 such that it may be held in place by the first bearing surface 117, the second bearing surface 119, and the third bearing surface 121. Although FIG. 8 illustrates an example of how a spoon 700 may be supported by the handle 100, the invention is not limited thereto. For example, in example embodiments, a groove 180 may be formed in the top part of the grip 118 and a portion of the spoon 700 may be inserted into the groove 180 as illustrated in FIG. 9. Although FIG. 9 illustrates two spoons 700 being supported by the handle 100, the invention is not limited thereto as the grip 118 may only be configured to support a single spoon 700 by way of the bearing surfaces 117, 119, and 121 or by way of the groove. In addition, while FIG. 9 only shows a single groove 180, the invention is not limited thereto as the handle may be configured with multiple grooves to allow multiple utensils to attach thereto.

While example embodiments have been particularly shown and described with reference to example embodiments thereof, it will be understood by those of ordinary skill in the art that various changes in form and details may be made therein without departing from the spirit and scope of the invention.

I claim:

1. A system comprising:
a container;
a lid configured to cover an opening of the container; and
a handle extending across the container, wherein the handle includes a first end pivotally connected to the container and a second end pivotally connected to the container so the handle may be rotated about a first axis and so the handle may be pivoted from a first position where a middle of the handle substantially overlies a middle of the container to a second position, the system being configured such that pivoting the handle from the first position to the second position does not move the lid and each of the first end and second end of the handle remain pivotally connected to the container during the pivoting action, a middle of the handle comprising a receiving area between the first end and the second end configured to receive an edge of the lid so that when the handle is pivoted to the second position the edge of the lid can be placed in the receiving area of the handle to support the lid over the container in a cantilevered manner, wherein the handle includes a first bearing surface and a second bearing surface offset from the first bearing surface to form the receiving area such that placing the edge of the lid in the receiving area places the edge between the first bearing surface and the second bearing surface so that a portion of a top of the lid bears against the first bearing surface and a portion of a bottom of the lid bears against the second bearing surface.

2. The system of claim 1, further comprising:
a structure having a guide groove and a nook, wherein a protrusion from the handle is configured to insert into the guide groove and into the nook.

3. The system of claim 2, wherein handle includes at least one lock configured to secure the lid against the container and the system is configured so that when the at least one lock secures the lid against the container the protrusion is inserted into the nook.

4. The system of claim 3, wherein the handle includes a grip collocated with the first bearing surface and wherein the at least one lock includes a first lock between the grip and the first end of the handle and a second lock between the grip and the second end of the handle.

5. The system of claim 4, wherein the first lock includes a first rotatable member configured to rotate into and press against the lid and the second lock includes a second rotatable member configured to rotate into and press against the lid.

6. The system of claim 5, wherein when the first rotatable member rotates into the lid a protrusion at a first end of the handle moves away from a bottom of the container and into a nook of a structure connected to the container.

7. The system of claim 2, wherein the structure is integral to the container.

8. The system of claim 2, wherein the structure is attached to the container.

9. The system of claim 1, wherein the container is a slow cooker.

10. The system of claim 1, wherein the handle includes a grip collocated with at least one of the first bearing surface and the second bearing surface.

\* \* \* \* \*